(12) United States Patent
Jaaskelainen et al.

(10) Patent No.: US 9,091,834 B2
(45) Date of Patent: Jul. 28, 2015

(54) FIBER SPLICE HOUSING WITH TEMPERATURE COMPENSATION

(71) Applicant: Halliburton Energy Services, Houston, TX (US)

(72) Inventors: Mikko Jaaskelainen, Katy, TX (US); Ian Bradford Mitchell, Houston, TX (US); Brian Vandelyn Park, Austin, TX (US); Jason Edward Therrien, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/757,735

(22) Filed: Feb. 1, 2013

(65) Prior Publication Data

US 2014/0219620 A1    Aug. 7, 2014

(51) Int. Cl.
*G02B 6/00* (2006.01)
*E21B 47/01* (2012.01)
*G02B 6/44* (2006.01)
*G02B 6/255* (2006.01)

(52) U.S. Cl.
CPC ............ *G02B 6/4471* (2013.01); *G02B 6/2558* (2013.01); *Y10T 29/49826* (2015.01)

(58) Field of Classification Search
CPC .................................. G02B 6/255; G02B 6/00

USPC ........................................................ 385/12, 13
See application file for complete search history.

(56) References Cited

U.S. PATENT DOCUMENTS

| | | | |
|---|---|---|---|
| 4,768,851 A * | 9/1988 | Shaw et al. | 385/28 |
| 4,863,270 A * | 9/1989 | Spillman, Jr. | 356/477 |
| 5,642,451 A | 6/1997 | Kennedy | |
| 5,768,464 A * | 6/1998 | Leonard | 385/139 |
| 6,229,827 B1 | 5/2001 | Fernald et al. | |
| 6,917,746 B2 * | 7/2005 | Simmons et al. | 385/137 |
| 7,093,638 B2 * | 8/2006 | Bonaventura | 156/351 |
| 7,641,395 B2 * | 1/2010 | Ringgenberg et al. | 385/53 |
| 8,025,445 B2 * | 9/2011 | Rambow et al. | 385/95 |
| 2003/0094281 A1 * | 5/2003 | Tubel | 166/250.03 |
| 2003/0141010 A1 * | 7/2003 | Pratt | 156/177 |
| 2004/0114902 A1 * | 6/2004 | Simmons et al. | 385/137 |
| 2005/0002636 A1 * | 1/2005 | Hammers | 385/147 |
| 2005/0037195 A1 * | 2/2005 | Warek | 428/364 |
| 2005/0279442 A1 | 12/2005 | Guven et al. | |
| 2008/0073084 A1 | 3/2008 | Ringgenberg | |
| 2010/0158435 A1 | 6/2010 | Kersey et al. | |
| 2010/0303426 A1 * | 12/2010 | Davis | 385/95 |
| 2010/0303427 A1 * | 12/2010 | Rambow et al. | 385/95 |
| 2010/0316088 A1 * | 12/2010 | Bayindir et al. | 374/100 |
| 2011/0135247 A1 * | 6/2011 | Achara et al. | 385/12 |
| 2013/0034324 A1 * | 2/2013 | Laing et al. | 385/13 |

* cited by examiner

*Primary Examiner* — Kaveh Kianni
(74) *Attorney, Agent, or Firm* — Michael A. Ervin; Krueger Iselin LLP

(57) ABSTRACT

A method and device for relieving thermal stresses on the optical fibers in fiber optic splice housings used in hostile thermal environments.

5 Claims, 1 Drawing Sheet

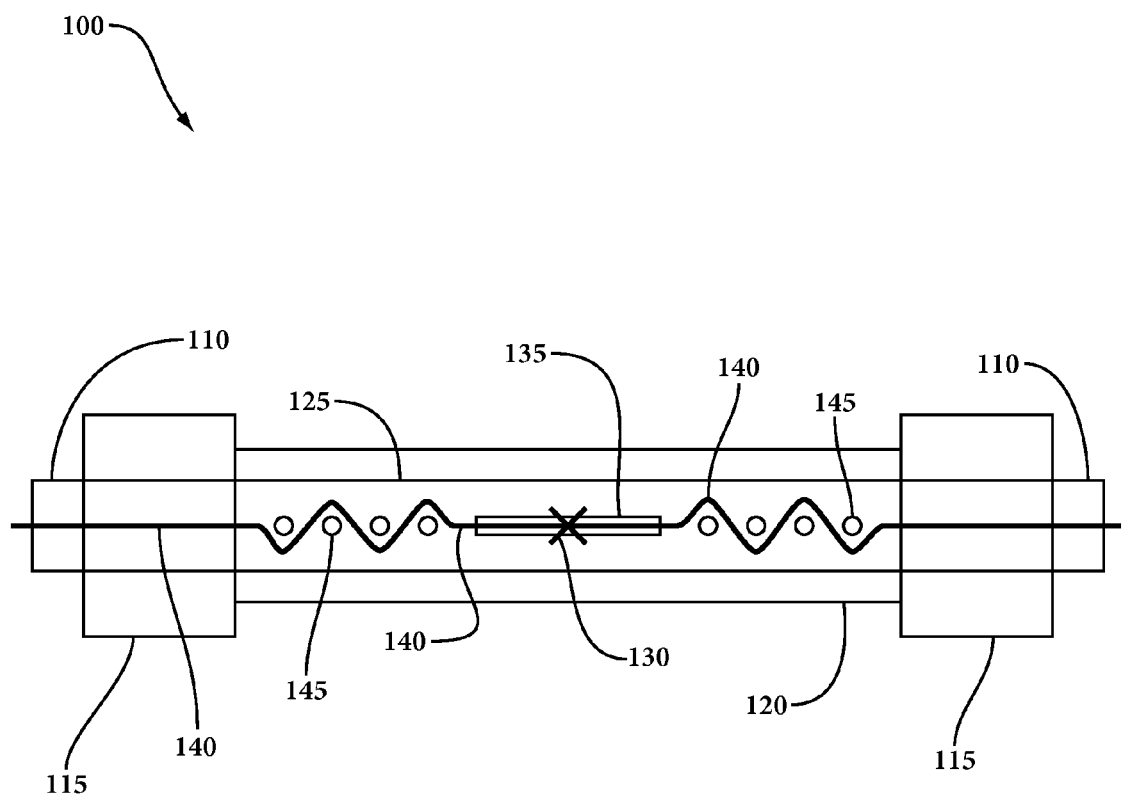

FIBER SPLICE HOUSING WITH TEMPERATURE COMPENSATION

CROSS-REFERENCE TO RELATED APPLICATIONS

Not applicable.

BACKGROUND

Fiber-optic sensors are increasingly being used as devices for sensing some quantity, typically temperature or mechanical strain, but sometimes also displacements, vibrations, pressure, acceleration, rotations, or concentrations of chemical species. The general principle of such devices is that light from a laser is sent through an optical fiber and there experiences subtle changes of its parameters either in the fiber or in one or several fiber Bragg gratings and then reaches a detector arrangement which measures these changes.

In particular a growing application field is the use of fiber optic sensing system for sensing when deployed in monitoring or production wells. Such sensors are particularly attractive because more conventional sensing systems are expensive to build, and in liquid environments susceptible to failure making them more expensive and difficult to maintain, Additionally, electrical systems are not well suited for in-well installation due to the hostile environment (pressures, temperatures, corrosion). Fiber optic systems do not suffer many of the limitations of electronics and are thus emerging as the technology of choice.

As the applications of fiber optic telemetry have expanded there is increased need to install multiple fiber optic sensors into the down-hole environment. Each sensor may require its own FIMT (fiber in metal tubing). The assembly of multiple sensors and the accompanying multiple FIMT's requires a number of optical fiber splice housings deployed throughout the down hole environment, In the current designs of these at high temperatures the housing can expand in length much greater than the fiber due to differences in the thermal expansion of metal and glass. This creates stress in the fiber that can affect the optical properties of the signal, or in worst case, cause the fiber to break.

There is a need to increase the reliability of the splice in these optical fiber splice housings and potentially eliminate the breakage of spliced optical fibers.

BRIEF DESCRIPTION OF THE DRAWINGS

FIG. 1 illustrates a proposed fiber optic splice housing.

DETAILED DESCRIPTION

In the following detailed description, reference is made that illustrate embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken in a limited sense, and the scope of the disclosure is defined only by the appended claims.

FIG. 1 illustrates a proposed solution to this need. Shown is a fiber optic splice housing 100 used down hole to connect fiber optic sensors and devices to optical fiber or FIMT (Fiber in metal tube). Typical sensors include pressure sensors, flow sensors, distributed temperature sensors, distributed acoustic sensors, and the like. A splice tray 125, typically a ~6.5 mm diameter metal tube with a cutout along its length, contains optical fiber 140 spliced together in the middle at a splice 130 with a splice cover 135 over it to protect it. The tray is contained in a pressure housing 120 that is attached to FIMTs 110 by compression fittings 115 at each end. Thus the housing takes all the pressure and tension in the string.

In existing versions the length of fiber in the splice tray is equivalent to the length of the pressure housing. The fiber is fixed at each end, usually with an adhesive like epoxy or RTV. As a result, when the splice housing is lowered in the well bore, it increases in temperature and expands, and so does the fiber. Since the coefficient of expansion of the metal is typically an order of magnitude greater than the fiber, the fiber is stressed in tension, which can affect the optical signals, and can break.

To eliminate this problem, the proposed embodiment overstuffs the fiber into the splice housing by forming a wave pattern on each side of the splice. There is typically a 2.5 mm difference between the expansion of the housing and the fiber over 1 m at a change in temperature of 300 degrees C., and so the wave pattern provides at least 1.5 mm extra length on each side of the splice such that the fiber and the housing are of identical length at maximum operating temperature. Drilling holes 145 in the splice tray 125 and passing removable pins through the holes create the wave pattern. The fiber 140 is woven around the pins to create a wave pattern, and then the pins are removed. The fibers maintain the wave shape inside the splice tray by springing against the walls of the tray. The diameter and number of pins determines the additional length of fiber that is needed.

The metal splice housing can now expand and contract as temperature fluctuates, without forcing the fiber into stress or shear.

The splice housing overstuffs the fiber in a wave pattern to increase its length inside the housing to prevent stress and shear at elevated temperatures.

The splice housing prevents stress from affecting the optical signal and the possibility of breaking the fiber. This increases the reliability of the optical system dramatically for high temperature applications.

Although certain embodiments and their advantages have been described herein in detail, it should be understood that various changes, substitutions and alterations could be made without departing from the coverage as defined by the appended claims. Moreover, the potential applications of the disclosed techniques is not intended to be limited to the particular embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized. Accordingly, the appended claims are intended to include within their scope such processes, machines, manufactures, means, methods or steps.

The invention claimed is:

1. A fiber optic splice housing for eliminating the tension in the fibers in the fluctuating thermal environment of a well bore comprising:
   a. a pressure housing surrounding a splice tray;
   b. Fiber in Metal Tubes (FIMT's) attached to each end of the pressure housing by compression fittings;

c. optical fibers deployed through said FIMT's and spliced together in the middle of the splice tray;
d. removable pins inserted along the length of the splice tray;
e. wherein the optical fibers deployed through the splice tray are woven around the removable pins in a wave pattern during assembly of the fiber optic splice housing before the removable pins are removed so that the enclosed fibers are longer than the housing and not in tension in the fluctuating thermal environment of a wellbore.

2. The fiber optic splice housing for eliminating the tension in the fibers in the fluctuating thermal environment of a well bore of claim 1 wherein the optical fibers are feeding pressure sensors.

3. The fiber optic splice housing for eliminating the tension in the fibers in the fluctuating thermal environment of a well bore of claim 1 wherein the optical fibers are feeding flow sensors.

4. The fiber optic splice housing for eliminating the tension in the fibers in the fluctuating thermal environment of a well bore of claim 1 wherein the optical fibers are feeding distributed temperature sensors.

5. The fiber optic splice housing for eliminating the tension in the fibers in the fluctuating thermal environment of a well bore of claim 1 wherein the optical fibers are feeding distributed acoustic sensors.

* * * * *